United States Patent [19]
Huemmer

[11] 3,798,053
[45] Mar. 19, 1974

[54] CONTROL OF ATMOSPHERIC COMPOSITION DURING RADIATION CURING

[75] Inventor: Thomas F. Huemmer, South Bend, Ind.

[73] Assignee: The O'Brien Corporation, South Bend, Ind.

[22] Filed: Mar. 30, 1971

[21] Appl. No.: 129,586

[52] U.S. Cl... 117/93.31, 117/161 KP, 117/161 ZB, 250/49.5 TE
[51] Int. Cl. ....... B44d 1/50, C09d 3/58, C09d 3/72
[58] Field of Search..... 117/93.31, 161 KP, 161 ZB; 118/49.1, 49.5, 620; 250/49.5 TE

[56] References Cited
UNITED STATES PATENTS
3,654,459  4/1972  Coleman................. 250/49.5 TE
3,188,228  6/1965  Magat et al................ 117/93.31

OTHER PUBLICATIONS
"Products Finishing" Jan. 1970 pp. 130–134

Primary Examiner—William D. Martin
Assistant Examiner—John H. Newsome
Attorney, Agent, or Firm—Merriam, Marshall, Shapiro & Klose

[57] ABSTRACT

A method for in situ radiation polymerization or curing of air inhibited compositions as coatings on substrates in the presence of limited but still substantial amounts of oxygen. As much as 7.5 percent by weight of oxygen may be present if the radiation dose is fixed by the formula:

$$(D_c = X(O_2 \text{ level}) + C$$

wherein $D_c$ is the total dose required to cure to a tack-free state, ($O_2$ level) is the oxygen content of the atmosphere in percent by weight, C is the total dose that would be required in an oxygen free atmosphere and X is variable depending upon the composition of the coating and the composition of the inert atmosphere.

4 Claims, No Drawings

CONTROL OF ATMOSPHERIC COMPOSITION DURING RADIATION CURING

The present invention relates to the field of coatings, and is specifically directed to a process for curing coatings and films on substrates, wherein a substantially completely convertible, film-forming, polymerizable coating composition is cured in situ upon a substrate at a low temperature under the influence of ionizing radiation, and particularly electron beam radiation. More particularly, this invention relates to a method of curing which includes control of the composition of the atmosphere surrounding the film during the curing step in order to achieve an efficient complete curing of the coating and to obviate the formation of films having tacky surfaces.

The prior art has described many film forming compositions which can be polymerized at low temperatures without resort to use of usual polymerization catalysts, and such compositions are available in the form of flowable liquids which can be applied to various substrates in the form of thin film by conventional methods such as spraying, dipping or brushing. While the problem of air inhibition has been recognized for some time, little has been said in the prior art on means for overcoming or obviating the problem of air inhibition other than the blanket statements that the coatings to be cured by the electron beam must be cured in an inert atmosphere.

It has now been discovered that the prior art coating compositions may be cured to produce tack-free films in atmospheres which contain oxygen, so long as the oxygen content of the atmosphere is kept within the limits set ferth below and so long as the dose rate and total dose are suitably regulated.

In order to be commercially useful, it is necessary that coating compositions cured by electron beam curing apparatus or other apparatus producing ionizing radiation produce a cured film of high integrity. A tack free, marresistant surface having good chemical resistance is generally required. The probability of such properties occuring must be at least equal to or exceed those of the high performance catalysts cured coatings on the market today. One major key to the development of the surface properties of the film appears to be a function of the atmosphere surrounding the film during the radiation.

A number of systems have been proposed to limit or exclude oxygen from the surface of films being cured. It has been proposed to add a wax or wax-like material to the coating composition, whereby the wax would migrate to the surface of the film to form a continuous protective film on the surface of the coating to be cured. Although paraffin waxes have been successfully used in curing coatings using ultraviolet radiation, the use of wax and other temporary barriers in electron beam curing has been disappointing. Because of the very rapid cure times achieved by electron beam radiation, these waxes and wax-like materials do not have time to form a continuous film on the surface of the coating and have been relatively unsuccessful for use in electron beams.

On the other hand, the total exclusion of oxygen from the atmosphere surrounding the coating during the cure under electron beam radiation has been successful in the development of good film properties. However, in commercial operations, and particularly in operations wherein the curing operation is to be continuous, or semicontinuous, it has been found impracticable to exclude all oxygen from the surrounding atmosphere, although it is possible to reduce the oxygen level in the surrounding atmosphere.

It has been discovered that polymerizable films can be suitably cured by subjecting the films to electron beam radiation in the presence of controlled amounts of oxygen in the atmosphere surrounding the coating at the situs of the cure. However, when the oxygen levels of the atmosphere exceed about 1 percent by weight, it is necessary to increase the total absorbed dose of radiation above the total dose necessary to cure in an oxygen free atmosphere. It has been determined that for acrylate systems up to about 5 percent by weight of oxygen or even higher can be tolerated in the atmosphere so long as the total absorbed dose of radiation is suitably raised, such as to as high as about 10 MRads.

The above oxygen tolerance levels are for systems incorporating acrylate functionality. Systems containing other types of unsaturation, such as methacrylate or other vinylic compounds, are far less responsive to total dosage and are most sensitive to atmosphere considerations. Acrylic systems are merely used throughout the specification as an example because of their responsiveness to the energy source of electron beam or of the application of ultraviolet radiations. A useful system is described by its oligomeric component or prepolymer which must contain at least 0.5 moles of acrylate units per 1,000 grams of material. This oligomer or prepolymer is typically dissolved in a monomer or mixture of monomers to complete the system. Preferably a corresponding (acrylate) monomer is used as the solvent.

Those skilled in the art will be aware that other oligomers may be used, such as those containing methacrylate functions, or other vinyl functional groups including styrene-unsaturated polyesters, and that the examples showing the atmospheric considerations as applied to the acrylates are applicable in principle to the other types of oligomers.

The composition coated on the surface of the substrate is a liquid, polymerizable organic composition, either a polymer, oligomer, monomer, or a solution of polymer or oligomer in monomer. The coating must be capable of being cured either by high energy radiation or by ultraviolet light.

For the purpose of the present invention a wide variety of acrylate containing prepolymers or oligomers may be used in the coating. Suitable prepolymer types may be prepared by reacting the epoxy functional material with acrylic acid, hydroxylfunctional materials with a diisocyanate, esterification of alcohol functions with acrylic acid or the like, condensation of silicone derivatives with hydroxy contained acrylates and the like. A variety of substituents have already been described in the patent literature.

Polymerizable organic compositions which may be used include: polymers of acrylate esters, epoxy-acrylates, vinyl esters, unsaturated polyesters, and solutions of the afore-mentioned polymers or oligomers in monomers of a similar type. Specifically, unsaturated polyesters such as condensates of propylene glycol, maleic anhydride and phthalic anhydride dissolved in styrene, methyl methacrylate or mixtures of these monomers; epoxy-acrylates such as those sold under the trademark Epocril E-11, or solutions of these resins in styrene or acrylate ester monomers; acrylic monomer-polymer syrups such as poly-n-butylmethacrylate dissolved in monomeric n-butyl methacrylate; monomers such as vinyl acetate, vinyl pyrrolidone, ethyl acrylate, ethylene dimethyacrylate, and mixtures, of these, may be used.

Polylite 8183 (trademark of Reichhold Chemicals, Inc., White Pains, N.Y.), Stypol 40-2224 (trademark of Mattenson-Van Way, Inc.), and Roskydal UV-11 (from Naftone, Inc.) are typical of many commercially available polyester resins intended for premix molding in similar applications. They are generally solutions of a phthalic-maleic-ethyleneglycol alkyd resin in styrene or vinyl toluene. A typical composition would be 70 percent alkyd resin and 30 percent styrene. These are generally classed as semi-rigid resins when polymerized. Such solutions are typical of those useful as the liquid coating material in this invention.

A mixture of monomers may be used if desired. Exemplary of monomers which may be used include, particularly, vinyl monomers, such as vinylidene chloride, vinylidene fluoride, vinyl acetate, vinyl propionate, acrylonitrile, styrene, acrylic and methacrylic esters, and vinyl ethers. The amount of polymezable monomer used is dependent on the particular surface coating used, the particular monomer employed, and the properties of the cured coating desired.

For purposes of the present invention a wide variety of inert gases may be used to make up the bulk of the atmosphere in which the film is irradiated. The present invention contemplates the use of nitrogen, argon, helium, methane, carbon dioxide, and the like, as well as mixtures of gases, such as combustion gas formed by the complete or partial combustion of a hydrocarbon gas. Although the examples set forth illustrate the use of nitrogen, helium, and carbon dioxide, and show the differences between these gases as cure atmospheres in terms of cure parameters and film properties, such as mar resistance, tack-free cure point and the like, it will be obvious to those skilled in the art that mixtures of gases may be used and that the principles illustrated by the examples are applicable thereto.

It has been found that appropriate acrylate functional coating compositions can be cured in atmospheres containing less than 1 percent by weight of oxygen at relatively low total dose. In curing films in atmospheres containing more than 1 percent oxygen level, the chemical composition of the balance of the atmosphere employed is critical, as are the curing conditions, including total dose, dose rate, film thickness, and film chemistry. Generally, it has been found that radiation curing in nitrogen based atmospheres containing as much as 5 percent by weight of oxygen can achieve films containing in excess of 95 percent gel, provided sufficient radiation (total dose) is used. While it is possible to cure films in atmospheres containing more than about 5 percent oxygen, for any given radiation dosage the percentage of cure, as measured by percentage of gel content, drops off rapidly as the oxygen level exceeds 5 percent.

Although frequently referred to in coating technology, the term "cure" needs clarification, particularly as that term is applied to curing by radiation. For the purposes of the present invention, the term "cure" refers to the point at which the surface of the coating just becomes tack free. Although this point may or may not coincide with the point at which the best balance of properties is achieved, for commercial development it represents a minimum cure which can be tolerated.

Using tack-free cure as a minimum criteria, it has been discovered that certain straight line relationships exist over the value of practical radiation dosages. It has been found that as the oxygen level in the atmosphere surrounding the coating increases the dose and sometimes the dose rate must be increased. Although the base atmosphere gas must be taken into account, it has been found that the following relationships exist.

$$D_c = X (O_2 \text{ level}) + C$$

Wherein $D_c$ represents the total dose required to cure to a tack-free state, $O_2$ level is the oxygen content of the atmosphere at the situs of the cure in percent by weight, C is the total dose required to cure to a tack-free state in an oxygen free atmosphere, and X is the slope of a plot of total dose required to give tack-free curve vs oxygen content of the atmosphere. X is a variable dependent upon the chemistry of the film being cured and the chemical make up of the inert portion of the atmosphere.

The following examples will serve to illustrate the curing of several films using the process of the present invention, but it is to be understood that the examples are set forth merely for illustrative purposes and many other types of resins can be cured within the scope of the present invention.

EXAMPLE 1

A prepolymer was prepared by reacting one mole of a polyether triol (produced from trimethylol propane and propylene oxide to a molecular weight of about 418 ) with three moles of toluene diisocyanate (an isomer mixture, containing about 50 percent by weight of the 2,4-isomer) at about 70°C. The material was permitted to react until the isocyanate reached the theoretical value of 13.3 percent. At this point, three moles of 2-hydroxyethyl acrylate was added to the intermediate, held at approximately 60° C., and allowed to react until the isocyanate value reached approximately zero. The resin was diluted by adding thereto an equal weight of acrylate monomer. This gave a composition containing 9.5 mole percent of the prepolymer. The viscosity of the mixture was 450 ± 100 cps.

A 0.5 mil film was drawn down on an aluminum substrate using a fixed clearance applicator. A strip approximately 3.5 inches by 4 inches was but from the coated substrate, weighed, and immediately inserted into the curing chamber. The curing chamber was 8 inches × 12 inches × 1.75 and had a 1 mil polyethylene window. The curing chamber was purged with an appropriate pre-mixed gas at a rate of 100 cubic feet per hour for approximately 30 seconds. The total elapse time from the drawn down to cure was approximately 6 minutes.

The absorbed dose was measured by the blue cellophane method described by Henley et al. "Analytical Chemistry 8", No. 10, 1580, (1956). The polymerizations were carried out at room temperature using a 300kv electron beam. A time average dose rate was determined by a method developed by High Voltage Engineering Corporation in 1966.

Generally, the gel fraction analysis were obtained by taking a small quantity of a cured film from a tin-free steel substrate using a razor blade. The film was extracted in a Soxhlet extractor using methyl-ethyl ketone solvent over a period of 24 hours. The residual film was dried to a constant weight in a vacuum oven 80° C. and the weight of the polymer remaining was taken as the weight of the coating gel fraction. It was determined that these results were reproducable within about 2 percent.

Table 1 below gives the gel percentages achieved by curing the film with 5 Mrads at a dose rate of 500 Mrads per minute in carbon dioxide, nitrogen and helium atmospheres containing various amounts of oxygen.

TABLE 1

Gel Percentage of Films Cured at 5 MRads in Inert Atmospheres of Different Oxygen Concentration

| Oxygen % | Gel %-$CO_2$ | Gel %-$N_2$ | Gel %-He |
|---|---|---|---|
| 0 | 97.8 | 98.5 | 98.3 |
| 1.0 | 98.0 | 98.3 | 96.1 |
| 2.5 | 97.6 | 97.2 | 93.9 |
| 5.0 | 97.0 | 95.2 | 91.6 |
| 7.5 | 97.2 | 92.3 | 86.7 |

Although gel contents of 90 percent or more seem quite high, it should be observed that the non-gel components are concentrated on or near the surface of the film. Under the circumstances a film containing 90 percent gel can have rather poor surface properties.

From the data shown in Table 1 is becomes obvious that significant oxygen effects began to appear above the 1 percent oxygen concentration. These oxygen effects will result in poor surface cure, as evidenced by the mar resistance of the film. If the inert atmosphere contains less than 1 percent oxygen the surface defects are not apparent. It is interesting to note that the gel contents of films cured in atmospheres containing less than 1 percent oxygen concentration are well within the accuracy of the experimental technique.

The generally higher gel contents obtained for the carbon dioxide atmosphere is attributed to the stability of this gas to ionizing radiation. Principal radiolyses products of carbon dioxide have been shown to be carbon monoxide, oxygen, and ozone. Similar decomposition products have been reported when gaseous carbon dioxide is exposed to ultraviolet light. If appreciable quantities of the radiolyses products are produced, it is reasonable to assume a back reaction of carbon monoxide with either oxygen or ozone will take place thus stabilizing the atmosphere. The back reaction proceeds almost quantatively.

If the principal reactions with the coating surface involve either oxygen or ozone, then competitive surface effects might be minimized in carbon dioxide atmospheres, particularly when the system under study is capable of a very fast chain reaction when exposed to ionizing radiation. The addition of oxygen to the carbon dioxide atmosphere results in an increase in the ozone concentration upon irradiation, but has little or no effect on the carbon monoxide concentration. Thus only upon the addition of significant quantites of oxygen do some surface reactions become apparent in the data shown in Table 1.

Irradiation of mixtures of nitrogen and oxygen yield large amounts of $NO_2$ which does not readily decompose. When irradiated, $NO_2$ can react with $N_2$, however, forming both $N_2O$ and NO, the proportions of which are largely dependant upon the starting mixtures of $N_2$ and $O_2$. These reaction products can behave as radical scavengers and could tend to inhibit the propagation reaction on the coating surface. In addition, the lower molecular weight of the inert gas could facilitate surface reactions with either oxygen, ozone, or the radiolysis products. Thus, in Table 1 slightly lower gel contents are shown for films cured in nitrogen than for those cured in carbon dioxide for the same oxygen concentration in the inert atmosphere.

The greatest surface activity in the presence of oxygen for the gases investigated was observed for helium. Being the lightest of the gases studied, the excited helium atoms are not readily quenched and hence more activity might be predicted. Since helium is quite unreactive with oxygen, it might be expected that an appreciable amount of free radical telomerization involving oxygen might take place on the surface if the helium atmosphere contains significant quantities of oxygen.

The polymer described in Example 1 was found to cure readily to give a tack free film in a totally inert atmosphere of 100 percent nitrogen in the region of 1 MRads. It was found that using 100 percent nitrogen the dose rate could be varied from about 250 MRads per minute to about as high as 500 MRads per minute without materially affecting the cure achieved. At each dose rate, two MRads total dosage was enough to achieve 95 percent gel content.

The polymer system described above was cured, as described above, using nitrogen atmosphere containing various amounts of oxygen, including oxygen levels as high as about 7.5 percent. In each case the films were cured with a total dosage of 5 MRads, at dose rates varying from about 250 to 500 MRads per minute. The gel contents of the films so cured are given below in Table 2.

TABLE 2

Gel Percentage of Films Cured at 5 MRads Total Dosage in Nitrogen Atmosphere Containing Different Oxygen Concentrations

| Oxygen % | Gel % 250 MRads/Min | Gel % 360 MRads/Min | Gel % 500 MRads/Min |
|---|---|---|---|
| 0 | 97.6 | 98.0 | 98.5 |
| 1.0 | 97.8 | 98.1 | 98.3 |
| 2.5 | 95.0 | 95.9 | 97.2 |
| 5.0 | 90.0 | 92.2 | 95.2 |
| 7.5 | 87.3 | 90.1 | 92.3 |

It is apparent from the data shown in Table 2 that the oxygen inhibition is minimized by curing the film at the highest practical dose rate, for any given total dose. It has been found that good cures can be achieved with as much as 5 percent by weight oxygen in a surrounding atmosphere, using a total dose of 5 MRads, provided the dose rate is at least as high as 500 MRads per minute. The same data indicates that the dose rate is not important when the oxygen content of the atmosphere is not higher than about 1 percent and the total dose rate is sufficiently high. When the oxygen content of the atmosphere exceeds 1 percent, it is essential that the dose rate be sufficiently high to avoid problems with oxygen inhibition.

A similar test to that described above was run but the films were cured at total dosage of 2.5 MRads. Again, the basic atmosphere was nitrogen, containing the amounts of oxygen shown below. The gel percentages of the films so cured are shown in Table 3.

TABLE 3

Gel Percentage of Films Cured at 2.5 MRads Total Dosage in Nitrogen Atmosphere Containing Different Oxygen Concentrations

| | Gel % | Gel % | Gel % |

| Oxygen % | 250 MRads/Min | 360 MRads/Min | 500 MRads/Min |
|---|---|---|---|
| 0 | 98.7 | 98.4 | 97.2 |
| 1.0 | 95.8 | 98.2 | 97.8 |
| 2.5 | 94.2 | 95.5 | 97.0 |
| 5.0 | 89.8 | 93.7 | 94.8 |
| 7.5 | 87.0 | 90.9 | 94.4 |

Comparing Table 2 and Table 3, where similar data has been collected only at a different total absorbed doses, it can be seen that dose rate effects become a little more pronounced and are noticed at lower levels of oxygen in the inert atmosphere for films cured at the lower total dose. This result might be associated with a slight undercure of the film at the lower total absorbed dose, which would permit oxygen to more readily diffuse into the film and inhibit the cross-linking reaction. The above results clearly demonstrate that the inhibiting effect of oxygen is diminished as the dose rate is increased at any fixed oxygen level in the inert atmosphere.

Free radical polymerizations generally tend to terminate by bimolecular reaction, and if certain assumptions are made, then a dose rate dependency should exist according to the dose rate raised to the 0.5 power. The failure to develop this dose rate dependency suggests non-steady state kinetics. An alternation in the termination rate constant accompanied by the well known Tromsdorff effect is postulated, thus radicals become trapped and buried in the polymer chain.

The effect of dose rate as a function of gel content for films cured in oxygen containing atmospheres at a total absorbed dose of 5 MRads is shown in Table 2 and at 2.5 MRads is shown in Table 3. Again, oxygen inhibition effects become apparent above concentration of 1 percent in the inert atmosphere and at this level, dose rate effects become evident. These dose rate effects are attributed to surface reactions with oxygen, since no dose rate effects are observed for films cured in a non-oxygen containing atmosphere.

Table 4 presents data on three different inert atmospheres containing various concentrations oxygen, and gives the amount of oxygen that can be tolerated at various total absorbed doses and still achieve a tack-free film of the coating composition described in Example 1.

In other words, Table 4 gives the total dosage necessary to give a tack-free cure at various oxygen levels for the coating composition of Example 1. The data presented in Table 4 is accumulated average values based on large numbers of actual experiments. Since "tack-free cure" is difficult to reduce to a mathematical point, it is felt that the average values presented herewith are more meaningful than the data resulting from any single experiment.

TABLE 4

Oxygen Percentage which can be Tolerated in Different Inert Atmospheres in Producing Tack-free Films at Various Dosages

| Total Dosage | He | $N_2$ | $CO_2$ |
|---|---|---|---|
| 1 MRad | 0 | 0 | 0 |
| 2.5 MRad | 1 | 1.3 | 1.7 |
| 5.0 MRad | 3 | 4.2 | 4.5 |
| 7.5 MRad | 4.5 | 6.8 | 7.9 |
| 10 MRad | 6.2 | 10.0 | 10.3 |

Based on the data shown in Table 4, the following formulas can be derived:

$$D_c = 0.86 (O_2) + 1.0 (CO_2)$$
$$D_c = 0.92 (O_2) + 1.0 (N_2)$$
$$D_c = 1.41 (O_2) + 1.0 (He)$$

Wherein $D_c$ represents the total dose in MRads required to achieve a tack-free cure, the $(O_2)$ figure represents the oxygen content of the atmosphere, in percent by weight, and the $CO_2$, $N_2$ and He identify the gas making up the balance of the atmosphere.

According to these equations, tack-free cures occur in the region of 1 MRad in an oxygen-free atmosphere. As the oxygen content is raised to about 1 percent by weight, in a nitrogen atmosphere about 2 MRads are required for a tack-free cure. These equations show that for inert atmospheres based on carbon dioxide, for instance, a slightly lower total dose will give a tack-free cure, as compared to the total dose necessary to give a tack-free cure in nitrogen. For all inert gases tested, the total dose required to achieve a tack-free cure is increased as the oxygen content of the inert gas increases. As was mentioned above it has been found that the increased dose requirement maintains a relatively linear relationship to the increasing oxygen content.

EXAMPLE 2

A resin was prepared by reacting one mole of hydroxyethyl acrylate and one mole of chlorendic anhydride. The product of this reaction was reacted with 1.06 moles on epoxy novolac sold under the trade name DEN 438. The epoxy novolac has an epoxide equivalent of 176–181 and a viscosity of 35,000–70,000 cps at 125°F.

The material is permitted to react for 4.0 hours, after which the acid number is about 8 and the epoxy number is about 0.29 indicating a reaction of 85–88 percent of the epoxy groups.

This resin thinned with an acylate monomer mixture and tested as described in Example 1.

Based on these tests the following formulas to determine the total dosage were derived:

$$D_c = 1.24 [O_2] + 1.3 (He)$$
$$D_c = 0.41 [O_2] + 1.3 (N_2)$$
$$D_c = 0.41 [O_2] + 1.3 (CO_2)$$

The data on which these formulas are based is shown in Table 5.

TABLE 5

Oxygen Percentage which can be Tolerated in Different Inert Atmospheres in Producing Tack-free Films at Various Dosages

| Total Dosage | He | $N_2$ | $CO_2$ |
|---|---|---|---|
| 1.3 MRad | 0 | 0 | 0 |
| 2.5 MRad | 1.5 | 2.5 | 2.5 |
| 5.0 MRad | 3.3 | 8.5 | 8.5 |
| 7.5 MRad | 5.0 | 14 | 14 |
| 10 MRad | 7.0 | 21.0 (Air) | 21.0 |

Although it is not necessary to produce films which have gel contents in excess of 95 percent by weight in order to produce a tack-free film, the quantity and character of the extractables becomes important in certain coating applications, for example, those coming in direct contact with food. Generally speaking, it is considered essential to produce coatings having molecular weights above at least 5,000, and films which are cured to the extent that at least 95 percent by weight of the coating is in the form of a non-extractable gel.

Temperatures which may be used in the curing operation are limited only by the stability of the substrate and the stability and volatility of the liquid coating. Generally, temperatures ranging from 0° to 100° C., and preferably 15° to 80° C. are adequate.

High energy ionizing radiation, either particulate or electromagnetic, may be employed. Thus, the emission of highly accelerated electrons or nuclear particles, such as protons, neutrons, alpha particles, deuterons, beta particles, directed at the surface coating, are effective. The particles may be accelerated to high speeds by any number of known means such as a cyclotron or Van de Graaff generator. Effective results have been obtained, for example, using high energy electrons of from 20,000 to 10,000,000 electron volts emitted from a Van de Graaff generator. The dose should be sufficient to cure the surface coating to a firm, non-tacky film. Dose rates up to 5,000 MRads per minute may be used. In particular, when using electron beam radiation, dose rates of from 1 MRad per minute to 5,000 MRads per minute may be employed.

Total dosages of between 10 and 15 MRads are presently considered the maximum practical total dose. When the total dose exceeds 15 MRads competitive reactions, which compete with the curing reaction, may take place. Such reactions can deteriorate film properties and are generally best avoided.

Substrate material which may be used in the process of this invention may include any number of material, such as paper, wood, or metal. Specifically, wood in the form of lumber, veneer, plywood, particleboard, and hardboard; and metals such as aluminum, steel and various alloys may be used.

Utilizing the process of this invention, coatings can be tailored to meet a substantial number of desired uses. For example, a tough flexible polyester substrate coating onto which is graft polymerized an acrylic ester surface coating, gives the coating hardness and scratch resistance. Also, a polyester or acrylic surface coating with appreciable water tolerance can be prepared by suitable formulation and monomer selection. Such surface modifications are highly desirable in many commercial uses today.

The forms of the invention herein shown and described are to be considered only as illustrative. It will be apparent to those skilled in the art that numerous modifications may be made therein without departure from the spirit of the invention or the scope of the appended claim.

I claim:

1. In a method for applying a continuous coating to the exterior surface of an article of manufacture, wherein a flowable, polymerizable coating material comprising a urethane acrylic oligomer is applied as a liquid film to said surface, and said film is polymerized in situ thereon by passing said film through a beam of polymerization effecting electrons from an electron beam, the improvement which comprises adjusting the oxygen content of the atmosphere at the point of incidence of said film and said beam of polymerization effecting electrons by the addition of an inert gas selected from the group consisting of carbon dioxide, nitrogen and mixtures thereof to the atmosphere, whereby said atmosphere contains from about 1.0 to about 7.5 percent by weight oxygen, subjecting said film to a minimum radiation dose equal to the oxygen content of the atmosphere (in percent by weight) multiplied by 0.86, plus 1 MRad.

2. In a method for applying a continuous coating to the exterior surface of an article of manufacture, wherein a flowable, polymerizable coating material comprising an epoxy acrylate containing halogen species is applied as a liquid film to said surface, and said film is polymerized in situ thereon by passing said film through a beam of polymerization effecting electrons from an electron beam, the improvement which comprises adjusting the oxygen content of the atmosphere at the point of incidence of said film and said beam of polymerization effecting electrons by the addition of an inert gas selected from the group consisting of carbon dioxide, nitrogen and mixtures thereof to said atmosphere, whereby said atmosphere contains from about 1.0 percent to about 7.5 percent by weight oxygen, subjecting said film to a minimum radiation dose equal to the oxygen content of the atmosphere (in percnet by weight) multiplied by 0.41, plus 1.3 MRads.

3. In a method of painting the exterior surface of a substrate, comprising applying a flowable, polymerizable coating material comprising a urethane acrylic oligomer to a substrate toform a film of up to about 10 mils average depth, passing said film through a beam of high energy ionizing radiation, the improvement which comprises adjusting the oxygen level of the atmosphere surrounding said film in the vicinity of said beam by passing nitrogen gas over said substrate, whereby the effective oxygen content of said atmosphere is from about 1.0% to about 7.5 percent by weight, subjecting said film to a radiation dose, the minimum of which equals one plus the oxygen content multiplied by 0.92 MRads.

4. In a method of painting the exterior surface of a substrate, comprising applying a flowable, polymerizable coating material comprising an epoxy acrylate containing halogen species to a substrate to form a film of up to about 10 mils average depth, passing said film through a beam of high energy ionizing radiation, the improvement which comprises adjusting the oxygen level of the atmosphere surrounding said film in the vicinity of said beam by passing nitrogen gas over said substrate, whereby the effective oxygen content of said atmosphere is from about 1.0 to about 7.5 percent by weight, subjecting said film to a radiation dose the minimum of which equals 1.3 plus the oxygen content multiplied by 0.41 MRads.

* * * * *